(12) United States Patent
Sun (10) Patent No.: US 12,201,213 B1
(45) Date of Patent: Jan. 21, 2025

(54) MODULAR AND EXPANDABLE STORAGE RACK FOR QUICK ASSEMBLY AND DISASSEMBLY

(71) Applicant: Yangzhou Kangle Machinery Co., Ltd., Jiangsu (CN)

(72) Inventor: Bisheng Sun, Jiangsu (CN)

(73) Assignee: Yangzhou Kangle Machineery Co., Ltd., Yangzhou (CN)

( * ) Notice: Subject to any disclaimer, the term of this patent is extended or adjusted under 35 U.S.C. 154(b) by 0 days.

(21) Appl. No.: 18/520,179

(22) Filed: Nov. 27, 2023

(30) Foreign Application Priority Data

Nov. 14, 2023 (CN) .......................... 202323073245.0

(51) Int. Cl.
*A47B 47/00* (2006.01)
*A47B 43/04* (2006.01)
*A47B 57/30* (2006.01)
*A47B 87/00* (2006.01)

(52) U.S. Cl.
CPC .......... *A47B 47/0016* (2013.01); *A47B 43/04* (2013.01); *A47B 47/0008* (2013.01); *A47B 57/30* (2013.01); *A47B 87/005* (2013.01)

(58) Field of Classification Search
CPC ... A47B 47/0016; A47B 57/30; A47B 87/005; A47B 47/0008; A47B 47/0033; A47B 47/0041; A47B 47/005; A47B 43/04; F16B 12/40; F16B 12/42; F16B 12/44
USPC .................................................. 211/188, 182
See application file for complete search history.

(56) References Cited

U.S. PATENT DOCUMENTS

| | | | | |
|---|---|---|---|---|
| 898,970 A * | 9/1908 | Cook | ..................... | A47B 57/04 |
| | | | | 108/1 |
| 1,206,770 A * | 11/1916 | Adams | ................... | A47B 55/02 |
| | | | | 211/180 |
| 2,742,956 A * | 4/1956 | Cannata | .................. | A45B 3/00 |
| | | | | 297/118 |
| 2,839,320 A * | 6/1958 | Hill | ....................... | F16B 7/0486 |
| | | | | D8/382 |
| 2,882,032 A * | 4/1959 | Garner | .................... | F27D 3/123 |
| | | | | 296/3 |
| 3,218,097 A * | 11/1965 | Bowers | ................... | F16B 7/025 |
| | | | | 403/295 |
| 3,254,774 A * | 6/1966 | Schild | ..................... | F16B 12/34 |
| | | | | 211/182 |
| 3,675,981 A * | 7/1972 | Mallander | .............. | A47B 43/04 |
| | | | | 312/5 |

(Continued)

*Primary Examiner* — Jennifer E. Novosad (57) ABSTRACT

A modular and expandable storage rack for quick assembly and disassembly includes a plurality of first connecting pieces, a plurality of second connecting pieces, a plurality of third connecting pieces, a plurality of fourth connecting pieces, a plurality of support rods, and a plurality of storage partitions, which are distributed in a rectangular array respectively. Each storage partition includes four connecting rods. Each first connecting piece, each second connecting piece, each third connecting piece, and each fourth connecting piece include a longitudinally-extending hollow tube and different quantity of side hollow tubes respectively to receive at least one corresponding support rod and at least one corresponding connecting rod. One opposing end of the first longitudinally-extending hollow tube is fixedly provided with a first bump for attaching to an outer side of one corresponding support rod.

8 Claims, 7 Drawing Sheets

(56) References Cited

U.S. PATENT DOCUMENTS

| | | | | |
|---|---|---|---|---|
| 3,724,678 A * | 4/1973 | Challier | F16B 7/22 | 403/189 |
| 4,242,969 A * | 1/1981 | Checkwood | F16B 12/06 | 108/190 |
| 4,419,938 A * | 12/1983 | Kaut | A47B 47/05 | 108/190 |
| 4,427,379 A * | 1/1984 | Duran | C21D 9/0025 | 296/3 |
| 4,630,550 A * | 12/1986 | Weitzman | A47B 13/06 | 403/171 |
| 4,815,727 A * | 3/1989 | Kiribuchi | A63B 9/00 | 182/178.1 |
| 4,921,369 A * | 5/1990 | Chew | A47D 7/002 | 403/174 |
| 4,930,643 A * | 6/1990 | Flum | A47B 87/0223 | 211/188 |
| 5,257,794 A * | 11/1993 | Nakamura | B62B 3/00 | 24/270 |
| 5,423,604 A * | 6/1995 | Chern | A47B 47/005 | 312/265.5 |
| 5,520,293 A * | 5/1996 | Hartley | A47B 81/068 | 211/26 |
| 5,590,794 A * | 1/1997 | Zachary | B07C 7/02 | 211/10 |
| 5,678,706 A * | 10/1997 | Husak | A47B 96/20 | 403/171 |
| 5,743,412 A * | 4/1998 | Noble | A47F 1/121 | 211/182 |
| 6,516,732 B1 * | 2/2003 | LaCombe | A47B 45/00 | 108/153.1 |
| 6,902,071 B2 * | 6/2005 | Vitale | G11B 33/0461 | 211/35 |
| 6,948,435 B1 * | 9/2005 | Sheng | A47B 47/0016 | 108/190 |
| 7,537,453 B2 * | 5/2009 | Morgan | G09B 19/00 | 434/80 |
| 7,850,021 B2 * | 12/2010 | Yang | A47B 47/0008 | 211/182 |
| 10,100,526 B2 * | 10/2018 | Knudson | A47B 47/0091 | |
| 10,260,227 B2 * | 4/2019 | Corbett | F16B 7/185 | |
| D854,232 S * | 7/2019 | Hargreaves | D26/138 | |
| 10,750,858 B1 * | 8/2020 | Barre | A47B 45/00 | |
| 11,638,480 B2 * | 5/2023 | Felsenthal | A47B 43/003 | 211/85 |
| 2006/0055289 A1 * | 3/2006 | Wu | F16B 12/32 | 312/6 |
| 2007/0227994 A1 * | 10/2007 | Cho | A47B 47/005 | 211/188 |
| 2009/0020669 A1 * | 1/2009 | Wang | A47B 43/04 | 248/220.1 |
| 2014/0353270 A1 * | 12/2014 | Murphy | A47B 87/0207 | 211/188 |
| 2015/0014265 A1 * | 1/2015 | Zhu | A47F 5/10 | 211/201 |
| 2016/0066688 A1 * | 3/2016 | Yu | A47B 47/0075 | 312/265.5 |
| 2017/0295956 A1 * | 10/2017 | Lin | A47F 5/01 | |
| 2019/0195257 A1 * | 6/2019 | Yu | F16B 12/40 | |
| 2021/0076818 A1 * | 3/2021 | Felsenthal | A47B 96/021 | |
| 2023/0157446 A1 | 5/2023 | Lim | | |
| 2023/0218079 A1 | 7/2023 | Hanlon | | |
| 2023/0271780 A1 | 8/2023 | Otto et al. | | |
| 2023/0276941 A1 | 9/2023 | Hanlon | | |
| 2023/0278792 A1 | 9/2023 | Mohanarajah et al. | | |

* cited by examiner

MODULAR AND EXPANDABLE STORAGE RACK FOR QUICK ASSEMBLY AND DISASSEMBLY

CROSS REFERENCE

This application claims priority benefits to Chinese Patent Application No. 202323073245.0, filed Nov. 14, 2023, the contents of which are incorporated herein by reference.

TECHNICAL FIELD

The present disclosure relates to the technical field of storage racks, and specifically to a storage rack convenient for assembly and disassembly.

BACKGROUND

Storage racks are often used in daily life and are suitable for kitchens and bathrooms as well as office spaces. A storage rack mainly includes support rods and carrying parts fixed to the support rods. The carrying parts of the existing storage rack are lifted mainly in two ways. The first way is gear adjustment according to a fixed distance, and thus the distance between the carrying parts cannot be arbitrarily changed. In the second way, a height of the carrying parts may be arbitrarily adjusted along the support rods, and the distance between the carrying parts may be adjusted according to actual requirements.

In order to facilitate transportation and storage, the storage rack attempts to be designed in a detachable manner. However, most of existing storage racks are structurally characterized in that integrated layer plates are connected and mounted through connecting pieces and long support rods, which still occupies a large space and is not conducive to disassembly and storage. In order to solve the above problems, the inventor proposes a storage rack convenient for assembly and disassembly.

SUMMARY

To solve the problems that a large space is occupied and disassembly and storage are not facilitated, an objective of the present disclosure is to provide a storage rack convenient for assembly and disassembly.

To solve the above technical problem, the present disclosure adopts the following technical solution: a storage rack convenient for assembly and disassembly includes first connecting pieces, second connecting pieces, support rods, and storage partitions, where the plurality of first connecting pieces are distributed in a rectangular array, the plurality of second connecting pieces are distributed in a rectangular array, the plurality of support rods are distributed in a rectangular array and located between the first connecting pieces and the second connecting pieces, and the storage partitions are located between the first connecting pieces and the second connecting pieces; and each of the first connecting pieces includes a long tube, one opposite end of each of the support rods is movably inserted into two ends of the long tube, an outer side of the long tube is fixedly provided with vertically distributed first short tubes, the two ends of the long tube and two ends of each of the first short tubes are fixedly provided with first bumps, and the first bumps are attached to outer sides of the support rods. One end of the long tube is sleeved at a top end of the support rod, and the support rod is squeezed by the first bump, such that the tightness of connection between the support rod and the long tube may be improved.

Preferably, each of the second connecting pieces includes a support tube, one end, away from a corresponding one of the first connecting pieces, of each of the support rods is movably inserted into one end of the support tube, an outer side of the support tube is fixedly provided with vertically distributed second short tubes, the one end of the support tube and two ends of each of the second short tubes are fixedly provided with second bumps, and the second bumps are attached to the outer sides of the support rods. One end of the support rod is inserted into the support tube, and the support rod is squeezed by the second bump, such that the tightness of connection between the support rod and the support tube may be improved.

Preferably, each of the storage partitions includes a storage net, side rods, and transverse rods, two ends of each of the plurality of side rods are movably inserted into opposite ends of the two first short tubes and opposite ends of the two second short tubes separately, two ends of each of the plurality of transverse rods are movably inserted into the opposite ends of the two first short tubes and the opposite ends of the two second short tubes separately, and the storage net is placed on the side rods and the transverse rods. A storage layer plate may be conveniently disassembled through the storage net, the side rods, and the transverse rods, such that an integrated structure is prevented from occupying a space.

Preferably, a first triangular block is fixedly arranged between the first short tubes and the long tube. The stability between the first short tubes and the long tube may be improved through the first triangular block.

Preferably, a second triangular block is fixedly arranged between the second short tubes and the support tube. The stability between the second short tubes and the support tube may be improved through the second triangular block.

Preferably, a first reinforcing plate and a second reinforcing plate are fixedly arranged inside each of the support rods, and the first reinforcing plate and the second reinforcing plate are vertically distributed.

With the above technical solution, the deformation resistance of the support rod may be improved through the first reinforcing plate and the second reinforcing plate.

Preferably, two ends of each of the support rods are both provided with circular arc structures. The situation of easy scratching during assembly may be avoided through the arrangement of the circular arc structures 33.

Preferably, one side, close to each of the transverse rods, of the storage net is provided with a bent structure. The bent structures may help the storage net to be separated from the transverse rods.

Compared with the prior art, the present disclosure has the following beneficial effects:

1. A basic frame may be formed through assembly between the plurality of first and second connecting pieces and the plurality of support rods, such that the structure is small and the occupied space is reduced during assembly. The occupied space may be conveniently reduced through the detachable storage partitions, such that the storage rack may be conveniently assembled and disassembled.

2. Through assembly among the storage net, the side rods, and the transverse rods, the storage layer plate may be conveniently disassembled, such that the integrated structure is prevented from occupying the space.

BRIEF DESCRIPTION OF THE DRAWINGS

To more clearly illustrate the technical solutions in the embodiments of the present disclosure or in the prior art, the accompanying drawings that need to be used in the description of the embodiments or the prior art will be briefly described below. Apparently, the accompanying drawings in the description below merely illustrate some embodiments of the present invention. Those of ordinary skill in the art may also derive other accompanying drawings from these accompanying drawings without creative efforts.

In the drawings: 1. first connecting piece; 11. long tube; 12. first short tube; 13. first triangular block; 14. first bump; 2. second connecting piece; 21. support tube; 22. second short tube; 23. second triangular block; 24. second bump; 3. support rod; 31. first reinforcing plate; 32. second reinforcing plate; 33. circular arc structure; 4. storage partition; 41. side rod; 42. transverse rod; 43. storage net; and 44. bent structure.

DETAILED DESCRIPTION OF THE EMBODIMENTS

The present disclosure will be described in detail below with reference to the accompanying drawings and in conjunction with embodiments. Various examples are provided by way of explanation of the present disclosure rather than limiting the present invention. Indeed, it will be apparent to those skilled in the art that modifications and variations may be made in the present disclosure without departing from the scope or spirit of the present invention. For example, features shown or described as part of one embodiment may be used in another embodiment to produce yet another embodiment. It is therefore desirable that the present disclosure encompasses such modifications and variations falling within the scope of the appended claims and their equivalents.

In the description of the present invention, the terms "longitudinal", "transverse", "up", "down", "front", "back", "left", "right", "vertical", "horizontal", "top", "bottom" and the like denote orientation or positional relationships based on those shown in the drawings, are intended for ease of description of the present disclosure only and not to require that the present disclosure must be constructed and operated in a particular orientation, and therefore cannot be construed as a limitation to the present invention. The terms "connected", "connection", and "arranged" used in the present disclosure should be understood in a broad sense, for example, which may refer to a fixed connection or a detachable connection; which may refer to a direct connection or an indirect connection through an intermediate component; which may refer to a wired electrical connection, a radio connection, or a wireless communication signal connection, and the specific meanings of the above terms may be understood by those of ordinary skill in the art according to a specific situation.

One or more examples of the present disclosure are shown in the accompanying drawings. The numerical and letter symbols are used in the detailed description to refer to the features in the drawings. Similar or like reference signs in the drawings and descriptions have been used to refer to similar or like parts of the present invention. As used herein, the terms "first", "second" and "third" are used interchangeably to distinguish one member from another and are not intended to denote the locations or importance of individual members.

Embodiment: as shown in FIGS. 1 to 5, the present disclosure provides a technical solution: a storage rack convenient for assembly and disassembly includes first connecting pieces 1, second connecting pieces 2, support rods 3, and storage partitions 4, where the plurality of first connecting pieces 1 are distributed in a rectangular array, the plurality of second connecting pieces 2 are distributed in a rectangular array, the plurality of support rods 3 are distributed in a rectangular array and located between the first connecting pieces 1 and the second connecting pieces 2, and the storage partitions 4 are located between the first connecting pieces 1 and the second connecting pieces 2; and each of the first connecting pieces 1 includes a long tube 11, one opposite end of each of the support rods 3 is movably inserted into two ends of the long tube 11, an outer side of the long tube 11 is fixedly provided with vertically distributed first short tubes 12, the two ends of the long tube 11 and two ends of each of the first short tubes 12 are fixedly provided with first bumps 14, and the first bumps 14 are attached to outer sides of the support rods 3. One end of the long tube 11 is sleeved at a top end of the support rod 3, and the support rod 3 is squeezed by the first bump 14, such that the tightness of connection between the support rod 3 and the long tube 11 may be improved.

Figure 3:
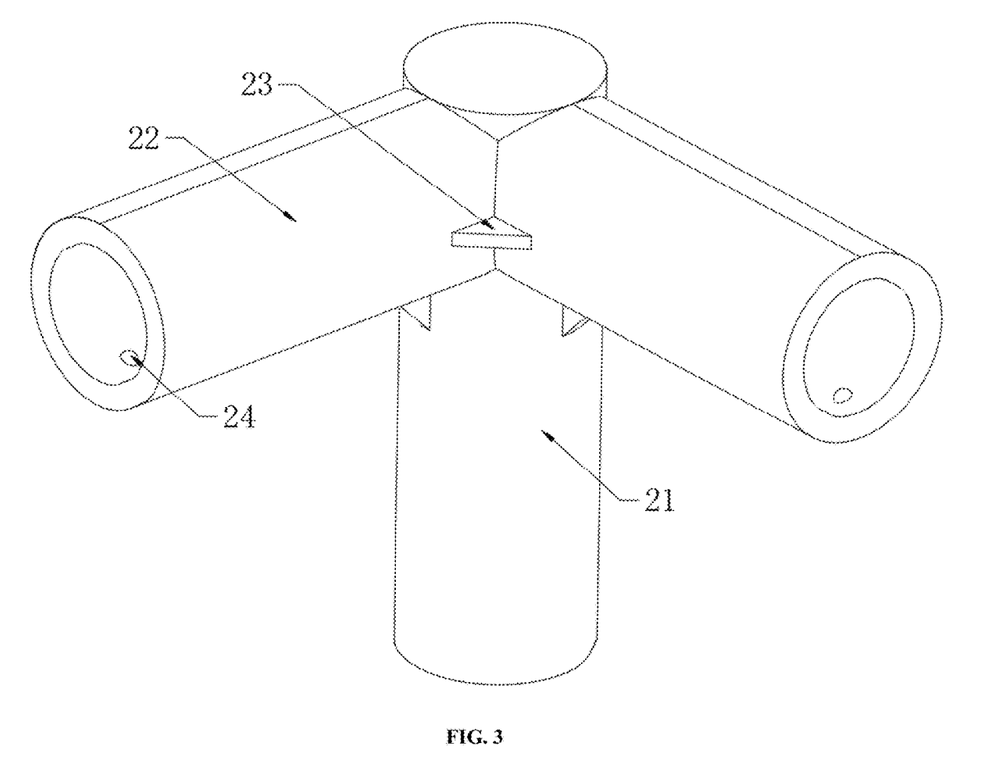
FIG. 3 is a schematic structural diagram of a second connecting piece in the present invention.

Each of the second connecting pieces 2 includes a support tube 21, one end, away from a corresponding one of the first connecting pieces 1, of each of the support rods 3 is movably inserted into one end of the support tube 21, an outer side of the support tube 21 is fixedly provided with vertically distributed second short tubes 22, the one end of the support tube 21 and two ends of each of the second short tubes 22 are fixedly provided with second bumps 24, and the second bumps 24 are attached to the outer sides of the support rods 3.

With the above technical solution, one end of the support rod 3 is inserted into the support tube 21, and the support rod 3 is squeezed by the second bump 24, such that the tightness of connection between the support rod 3 and the support tube 21 may be improved.

Figure 1:
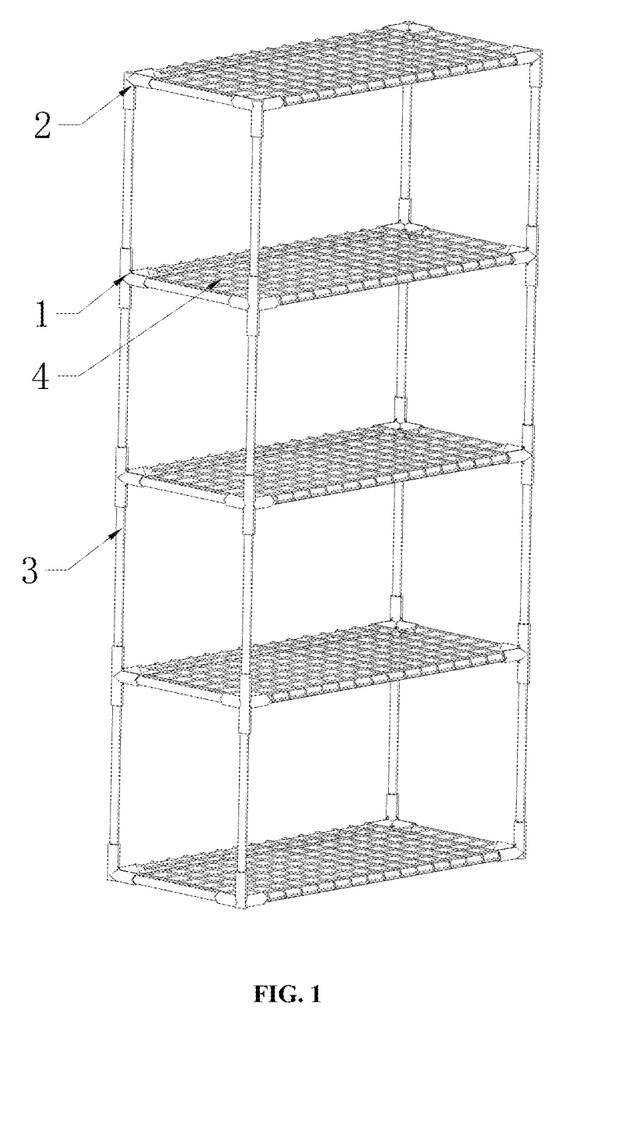
FIG. 1 is a schematic structural diagram of the present invention.
Figure 2:
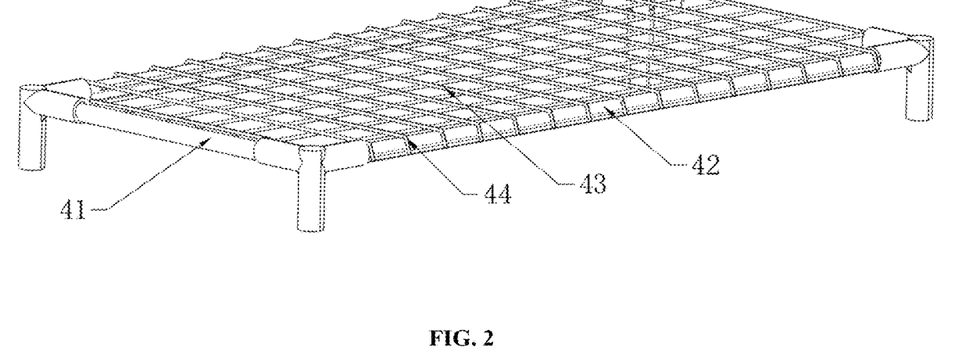
FIG. 2 is a schematic structural diagram of a storage partition in the present invention.

Each of the storage partitions 4 includes a storage net 43, side rods 41, and transverse rods 42, two ends of each of the plurality of side rods 41 are movably inserted into opposite ends of the two first short tubes 12 and opposite ends of the two second short tubes 22 separately, two ends of each of the plurality of transverse rods 42 are movably inserted into the opposite ends of the two first short tubes 12 and the opposite ends of the two second short tubes 22 separately, and the storage net 43 is placed on the side rods 41 and the transverse rods 42.

With the above technical solution, a storage layer plate may be conveniently disassembled through the storage net 43, the side rods 41, and the transverse rods 42, such that an integrated structure is prevented from occupying a space.

Figure 4:
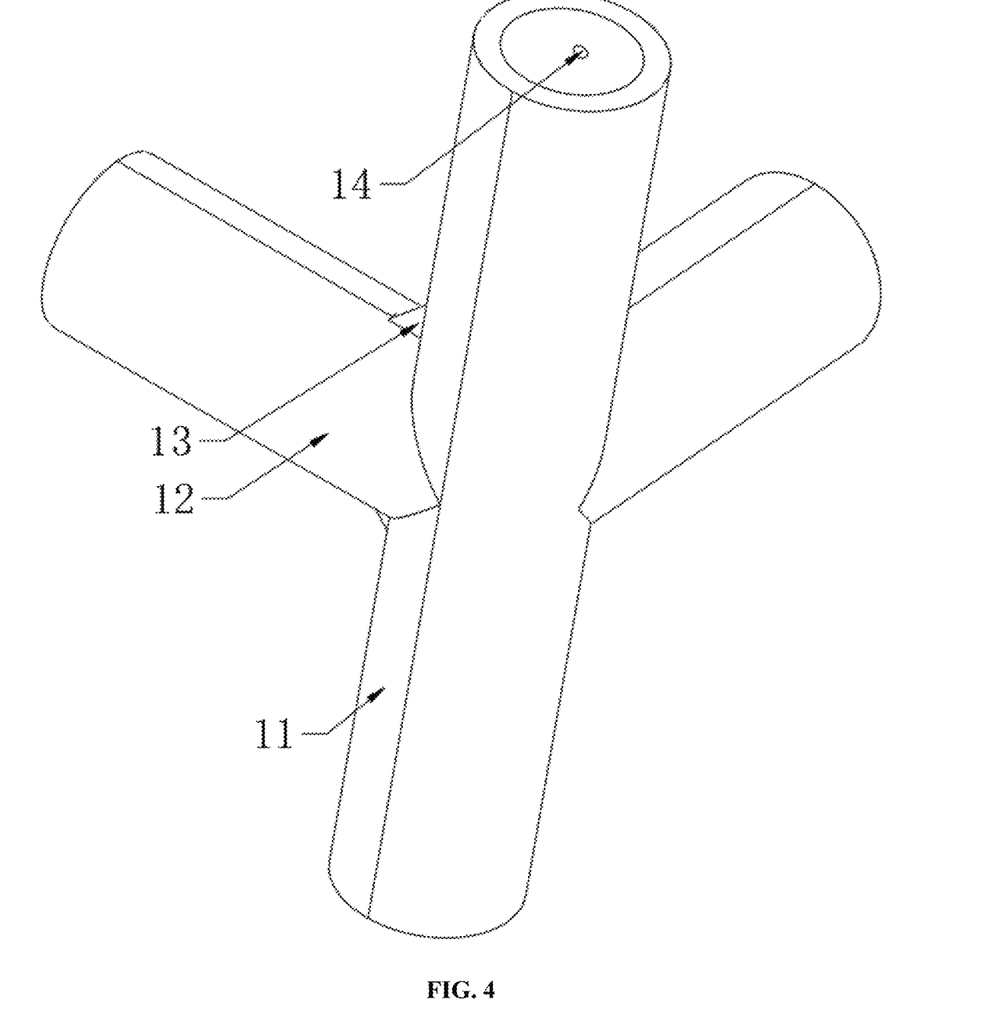
FIG. 4 is a schematic structural diagram of a first connecting piece in the present invention.

A first triangular block 13 is fixedly arranged between the first short tubes 12 and the long tube 11.

With the above technical solution, the stability between the first short tubes 12 and the long tube 11 may be improved through the first triangular block 13.

A second triangular block 23 is fixedly arranged between the second short tubes 22 and the support tube 21.

With the above technical solution, the stability between the second short tubes 22 and the support tube 21 may be improved through the second triangular block 23.

Figure 5:
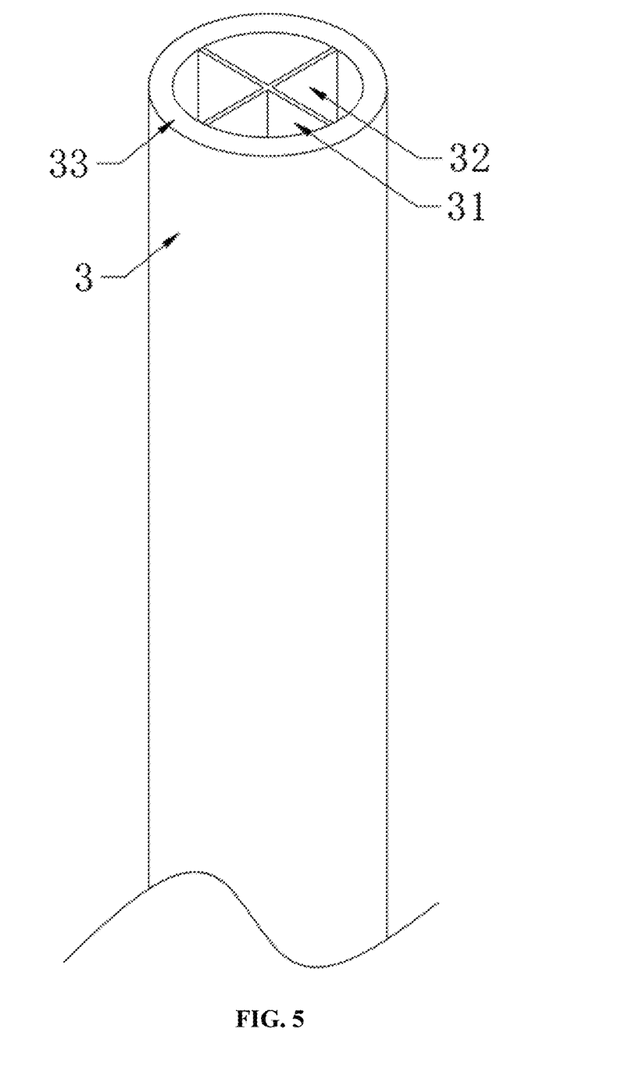
FIG. 5 is a schematic sectional view of a structure of a support rod in the present invention.
Figure 6:
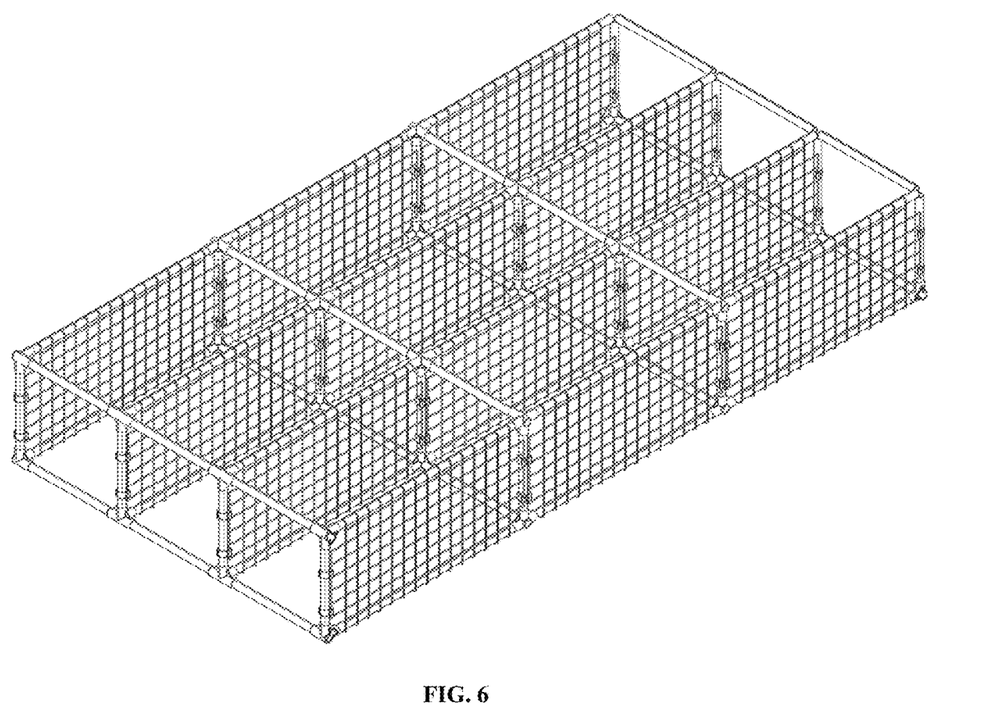
FIG. 6 is a schematic diagram of a composite structure combination in the present invention.
Figure 7:
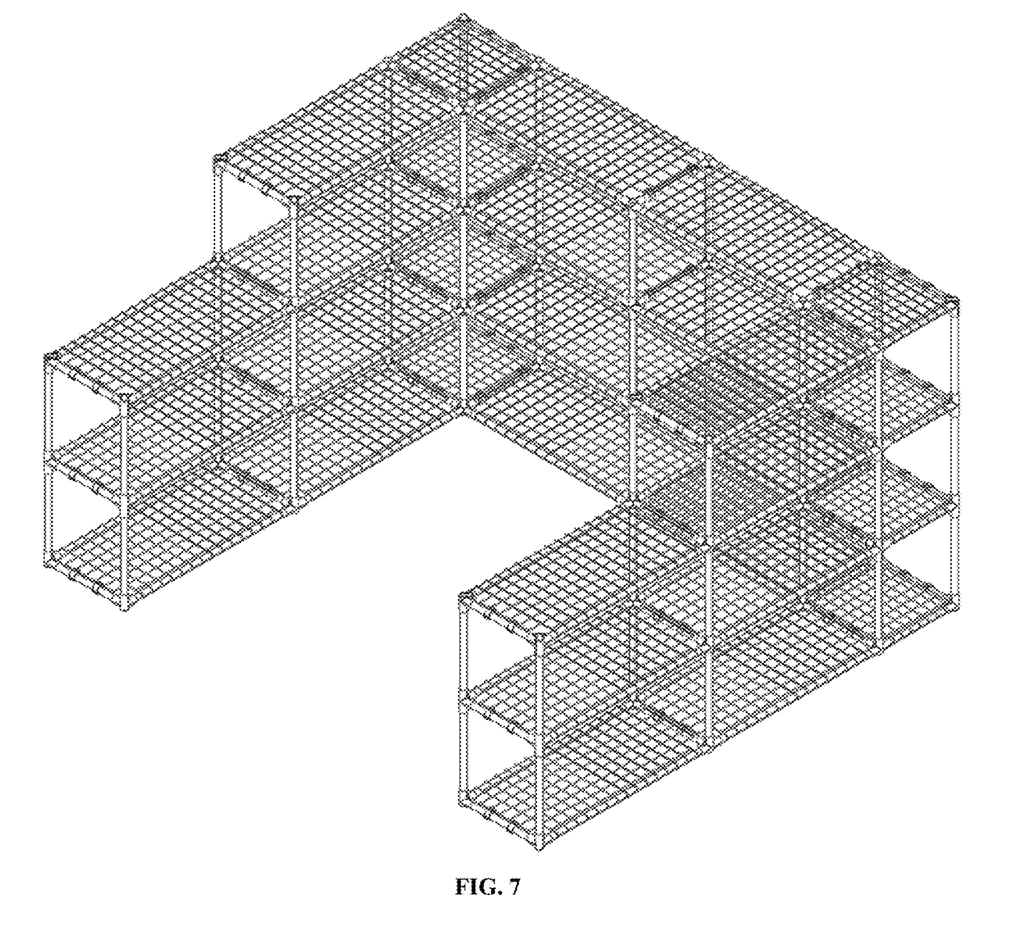
FIG. 7 is a schematic diagram of a U-shaped structure combination in the present invention.
Figure 8:
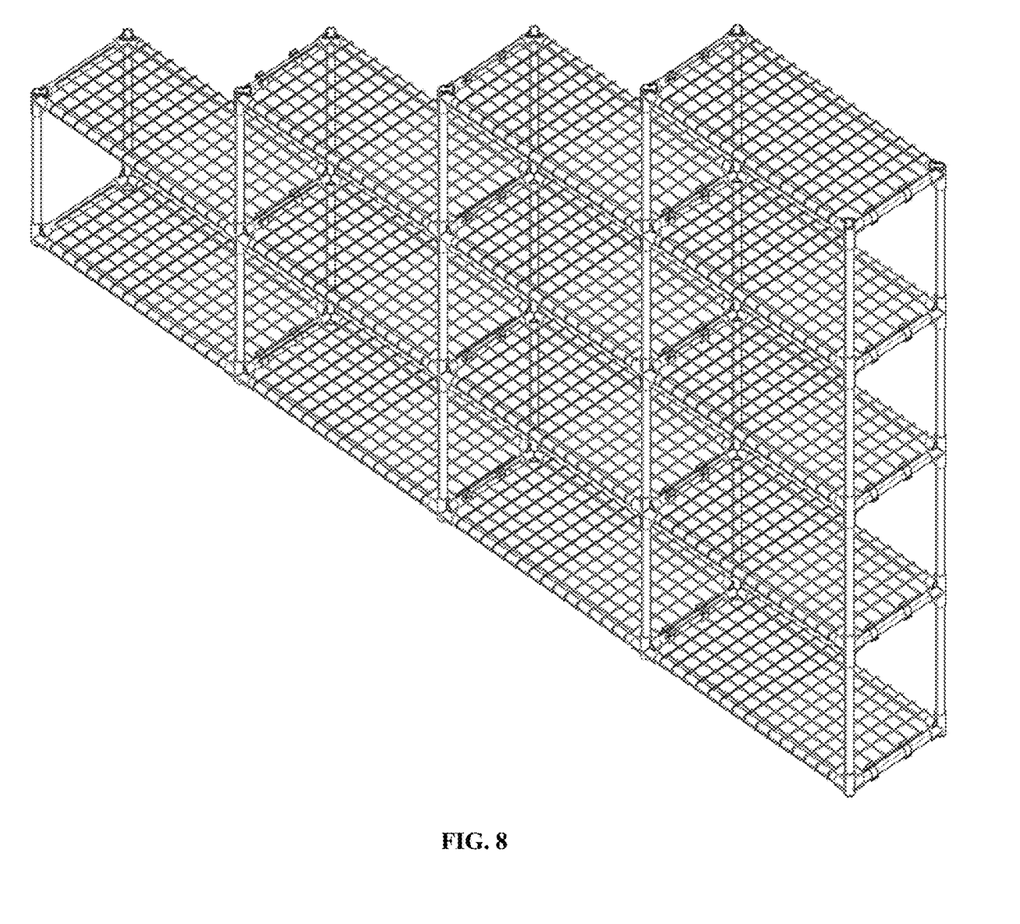
FIG. 8 is a schematic diagram of a stepped structure combination in the present invention.

A first reinforcing plate 31 and a second reinforcing plate 32 are fixedly arranged inside each of the support rods 3, and the first reinforcing plate 31 and the second reinforcing plate 32 are vertically distributed.

With the above technical solution, the deformation resistance of the support rod 3 may be improved through the first reinforcing plate 31 and the second reinforcing plate 32.

Two ends of each of the support rods 3 are both provided with circular arc structures 33.

With the above technical solution, the situation of easy scratching during assembly may be avoided through the arrangement of the circular arc structures.

One side, close to each of the transverse rods 42, of the storage net 43 is provided with a bent structure 44.

Through the arrangement of the circular arc structures, the bent structures 44 may help the storage net 43 to be separated from the transverse rods 42.

The working principle is as follows: first, one end of the support rod 3 is inserted into the support tube 21, and the support rod 3 is squeezed by the second bump 24, such that the tightness of connection between the support rod 3 and the support tube 21 may be improved; one end of the long tube 11 is sleeved at the top end of the support rod 3, and the support rod 3 is squeezed by the first bump 14, such that the tightness of connection between the support rod 3 and the long tube 11 may be improved; another support rod 3 is inserted into the top end of the long tube 11; by analogy, when the final support rod 3 is mounted, another support tube 21 is sleeved at the top end of the support rod 3, two ends of the side rod 41 are separately inserted into the two second short tubes 22 and the two first short tubes 12 to make the side rod 41 separately connect the two first short tubes 12 and the two second short tubes 22, two ends of the transverse rod 42 are separately inserted into the two second short tubes 22 and the two first short tubes 12 to make the side rod 41 separately connect the two first short tubes 12 and the two second short tubes 22 away from the side rod 41, such that the plurality of support rods 3 may be connected to form the frame, thereby achieving the purpose of convenience in assembly and disassembly; and finally, the storage net 43 is placed on the transverse rods 42.

Apparently, those skilled in the art may make various modifications and variations to the present disclosure without departing from the spirit and scope of the present invention. In this way, if these modifications and variations of the present disclosure fall within the scope of the claims of the present disclosure and their equivalents, the present disclosure is also intended to encompass these modifications and variations.

The above is merely a preferred embodiment of the present disclosure and is not intended to limit the present disclosure which may be subject to various modifications and variations to those skilled in the art. Any modifications, equivalent substitutions, improvements, etc. made within the spirit and principle of the present disclosure should be included within the scope of protection of the present invention.

What is claimed is:

1. A modular and expandable storage rack for quick assembly and disassembly, comprising a plurality of first connecting pieces, a plurality of second connecting pieces, a plurality of third connecting pieces, a plurality of fourth connecting pieces, a plurality of support rods, and a plurality of storage partitions, wherein the plurality of first connecting pieces are distributed in a rectangular array, the plurality of second connecting pieces are distributed in a rectangular array, the plurality of third connecting pieces are distributed in a rectangular array, the plurality of fourth connecting pieces are distributed in a rectangular array, the plurality of support rods are distributed in a rectangular array; and each of the plurality of storage partitions comprises four connecting rods, and two adjacent storage partitions located in a same plane share a same connecting rod;

each of the plurality of first connecting pieces comprises a first longitudinally-extending hollow tube and two first side hollow tubes radially-extending from a middle portion of the first longitudinally-extending hollow tube; wherein the first longitudinally-extending hollow tube has opposing ends for receiving two corresponding adjacent support rods or two corresponding adjacent connecting rods; the two first side hollow tubes are perpendicular to each other; each of the two first side hollow tubes has an open end for receiving one corresponding support rod or one corresponding connecting rod; one opposing end of the first longitudinally-extending hollow tube is fixedly provided with a first bump, and the first bump is attached to an outer side of one corresponding support rod;

each of the plurality of second connecting pieces comprises a second longitudinally-extending hollow tube and two second side hollow tubes radially-extending from an end portion of the second longitudinally-extending hollow tube; the second longitudinally-extending hollow tube has an open end for receiving one corresponding support rod; the two second side hollow tubes are perpendicularly to each other; and each of the two first side hollow tubes has an open end for receiving one corresponding connecting rod;

each of the plurality of third connecting pieces comprises a third longitudinally-extending hollow tube and three third side hollow tubes radially-extending from a middle portion of the third longitudinally-extending hollow tube; the third longitudinally-extending hollow tube has opposing ends for receiving two corresponding adjacent support rods or receiving one corresponding support rod and one corresponding connecting rod; two of the three third side hollow tubes are coaxial and perpendicular to a third of the three third side hollow tubes; and each of the three third side hollow tubes has an open end for receiving one corresponding support rod or one corresponding connecting rod; and each of the plurality of fourth connecting pieces comprises a fourth longitudinally-extending hollow tube and four fourth side hollow tubes radially-extending from a middle portion of the fourth longitudinally-extending hollow tube; the fourth longitudinally-extending hollow tube has opposing ends for receiving two corresponding adjacent support rods; the four fourth side hollow tubes are coplanar and perpendicular to each other; and each of the four fourth side hollow tubes has an open end for receiving one corresponding connecting rod.

2. The modular and expandable storage rack for quick assembly and disassembly according to claim 1, wherein each open end of each of the two second side hollow tubes is fixedly provided with a second bump, and the second bump is attached to an outer side of one corresponding connecting rod.

3. The modular and expandable storage rack for quick assembly and disassembly according to claim 2, wherein each of the storage partitions comprises a storage net; the four connecting rods are two side rods, and two transverse rods respectively; and the storage net is placed on the two side rods and the two transverse rods.

4. The modular and expandable storage rack for quick assembly and disassembly according to claim 3, wherein one side, the facing each of the two transverse rods, of the storage net is provided with a bent structure.

5. The modular and expandable storage rack for quick assembly and disassembly according to claim 2, wherein a second triangular block is fixedly arranged between the second longitudinally-extending hollow tube and two second side hollow tubes of each of the plurality of second connecting pieces.

6. The modular and expandable storage rack for quick assembly and disassembly according to claim 1, wherein a first triangular block is fixedly arranged between the first longitudinally-extending hollow tube and the two first side hollow tubes of each of the plurality of first connecting pieces.

7. The modular and expandable storage rack for quick assembly and disassembly according to claim 1, wherein a first reinforcing plate and a second reinforcing plate are fixedly arranged inside each of the plurality of support rods, and the first reinforcing plate and the second reinforcing plate are vertically distributed.

8. The modular and expandable storage rack for quick assembly and disassembly according to claim 1, wherein two ends of each of the plurality of support rods are both provided with circular arc structures.

\* \* \* \* \*